US00RE38877E

(19) United States
(12) Reissued Patent
Trabut

(10) Patent Number: US RE38,877 E
(45) Date of Reissued Patent: Nov. 15, 2005

(54) METHOD AND DEVICE FOR TRAINING THE TACTILE PERCEPTION OF A MARKSMAN, IN PARTICULAR A SPORT MARKSMAN

(76) Inventor: Pierre Trabut, 6 imp Anatole France, 37500 Chinon (FR)

(21) Appl. No.: 10/780,549

(22) PCT Filed: Oct. 1, 1997

(86) PCT No.: PCT/FR97/01728

§ 371 (c)(1),
(2), (4) Date: Apr. 1, 1999

(87) PCT Pub. No.: WO98/14744

PCT Pub. Date: Apr. 9, 1998

Related U.S. Patent Documents

Reissue of:
(64) Patent No.: 6,257,893
Issued: Jul. 10, 2001
Appl. No.: 09/269,798
Filed: Apr. 1, 1999

(30) Foreign Application Priority Data

Oct. 2, 1996 (FR) ..... 96 11992

(51) Int. Cl.[7] ..... F41A 33/00
(52) U.S. Cl. ..... 434/11; 434/16; 434/19; 73/379.02
(58) Field of Search ..... 434/11, 16, 18–22, 434/247, 307 R, 308, 365; 42/42.03, 69.02, 69.03, 70.08, 70.11, 84, 100, 103; 89/7, 41.03, 199; 70/277; 235/462.49, 472.03; 250/216; 345/179, 180, 302; 382/120; 359/795; 73/379.02; 124/31, 37; 463/51; 141/4

(56) References Cited

U.S. PATENT DOCUMENTS 3,230,421 A * 1/1966 Davis ..... 315/149
3,939,679 A * 2/1976 Barker et al. ..... 70/277
4,457,715 A * 7/1984 Knight et al. ..... 434/22
4,649,893 A * 3/1987 Heitz ..... 124/37
4,725,235 A * 2/1988 Schroeder et al. ..... 434/18
4,754,567 A * 7/1988 Lehfeldt et al. ..... 42/69.02
4,757,629 A * 7/1988 Austin ..... 42/84
4,923,402 A * 5/1990 Marshall et al. ..... 434/22
4,955,812 A * 9/1990 Hill ..... 434/16
5,194,007 A * 3/1993 Marshall et al. ..... 434/21
5,225,611 A * 7/1993 Scott ..... 42/42.03
5,303,495 A * 4/1994 Harthcock ..... 42/84
5,316,479 A * 5/1994 Wong et al. ..... 434/11
5,569,085 A * 10/1996 Igarashi et al. ..... 463/49
5,603,179 A * 2/1997 Adams ..... 42/70.08
5,641,288 A * 6/1997 Zaenglein, Jr. ..... 434/21
5,676,548 A * 10/1997 McAlpin et al. ..... 434/19
5,890,479 A * 4/1999 Morin ..... 124/31
5,966,859 A * 10/1999 Samuels ..... 42/70.11
6,418,981 B1 * 7/2002 Nitecki et al. ..... 141/4
6,563,940 B2 * 5/2003 Recce ..... 382/120

* cited by examiner

*Primary Examiner*—Joe H. Cheng
(74) *Attorney, Agent, or Firm*—Westerman, Hattori, Daniels & Adrian LLP

(57) ABSTRACT

For training the tactile perception of a marksman, in particular of a sport marksman, during the firing of a shot in which the marksman exercising a pressure on a trigger of a real or simulation firearm which triggers the shot when it crosses a predetermined threshold, a training process comprises (i) measuring the pressure exercised on said trigger by a finger of said marksman, (ii) converting said measured pressure into electric signals representing an instantaneous amplitude of a pressure vector, and (iii) transforming in real time said electric signals into signals perceptible by a sense of the marksman other than the tactile sense, so that the marksman can in real time follow the variation of the pressure exercised on said trigger until the departure of said shot in simultaneity and in synchronism with the tactile perception perceived by said finger. A training device for implementing this process is also provided.

21 Claims, 5 Drawing Sheets

METHOD AND DEVICE FOR TRAINING THE TACTILE PERCEPTION OF A MARKSMAN, IN PARTICULAR A SPORT MARKSMAN

Matter enclosed in heavy brackets [ ] appears in the original patent but forms no part of this reissue specification; matter printed in italics indicates the additions made by reissue.

FIELD OF THE INVENTION

The invention concerns a process for training the tactile perception of a marksman.

It also concerns a device for the actuation of this process.

The invention more particularly concerns the branch of sport shooting where success depends to a great extent on mastering the pressure of the finger on the trigger.

BACKGROUND OF THE INVENTION

Two fundamental parameters characterize the technique:

a/ being "opposite" the target;

b/ holding the firearm in a stable way at the moment of departure of the shot.

In order to master the departure of the shot, the marksman must be able to maintain and control the pressure of his forefinger on the trigger at the nearest possible value to that of the departure of the shot, in such a way as to reach it and to cross the threshold without disturbing the immobility of the firearm. Otherwise, the "finger blow" happens and leads to failure. The tactile sense allows the marksman to evaluate the value of the pressure exercised by the forefinger on the trigger, but not very precisely. The following exercise shows this: if one asks the marksman to compare the trigger of a gun model "DES 69" to that of a revolver model "MR73", he finds that of the "DES" heavier while the contrary is true (1000 gf against 1360 g, the error being due to the fact that the trigger of the "MR 73" is more progressive).

A good marksman (regional level) presses on the trigger as progressively as possible. He sends the order to his forefinger, then he does not think of it anymore while trying to remain in line. He has to be surprised by the departure of the shot.

An excellent marksman (international level) increases pressure until the threshold of departure of the shot. He maintains this critical pressure until the moment when his sighting line is perfect, and once stabilized, he crosses the threshold without moving his firearm.

A very good marksman (national level) oscillates between the two previous techniques, according to his shape of the moment.

SUMMARY OF THE INVENTION

Based on the finding that the tactile sense gives a very insufficient quantitative evaluation of the pressure, and in order to make up for this physiological drawback, one can only conclude that it is necessary to train the Pacini corpuscles which are the receivers of the deep pressure, situated under the skin of the first phalanx of the forefinger.

According to the invention, this training can be realized starting from a simple idea: basing oneself on the perception of our more exact senses (hearing and, above all, sight) to develop the acuteness of the tactile sense and of the tactile perception of the pressure.

By at least one supplementary perception (visual and/or auditive), the invention thus proposes to equip the marksman with two accompanying perceptions if the same tactile stimulus, advantageously simultaneous and proportional, allowing thus to refine and to train the tactile perception, and at the same time allowing to accustom the respective muscles to as exactly as possible dosing their effort of finding, as by reflex, the contraction level required.

In the known art, nothing of the like exists in this branch, so the idea arose to build a device allowing to quantify the pressure exercised by the forefinger on the trigger and to transform it in order to make it accessible simultaneously and in a proportionately quantified way to the sense of hearing and/or the sense of sight, which are more exact than the tactile sense, thus to get more exact information.

The transformation of pressure into signals can be effected according to three main embodiments; the second of these embodiments is more suitable for the aim than the first, and the last embodiment, involving a piezoelectric receiver, is the most suitable.

The piezoelectricity, which is maintained in a preferred embodiment of the invention, is applied to a firearm and to a shooting simulation system which features, besides the training of tactile perception in connection with motor skills, with the help of a video system equipped with a software interface, new pedagogic elements suitable for improving the marksman's technique: detection of the "finger blow" and indication of the stability of the firearm or of its motion at the departure of the shot. The shooting simulation system can be complemented with a device based on the use of an electromagnet, simulating the setback at the departure of the shot; this shooting simulation being practiced by firearm marksmen in the same way as compressed gas shooting which is part of the training of these marksmen.

The process according to the invention concerns real shooting as well as simulated shooting.

The invention thus has for object a process for training the tactile perception of a marksman, in particular of a sport marksman, said marksman exercising a pressure on the trigger of a real or simulation firearm, said pressure triggering off the shot when it crosses a predetermined threshold, characterized in that it includes at least the following steps:

measuring the pressure exercised on said trigger by the marksman's finger;

conversion of said measured pressure into electric signals representing the instantaneous amplitude of the pressure vector;

handling of said electric signals, perceptible by a sense of the marksman other than the tactile sense, so that he can in real time follow the variation of the pressure exercised on said trigger until the departure of said shot in simultaneity and synchronism with the tactile perception perceived by said finger.

The process and the device according to the invention present many advantages and, in particular, they contribute efficiently to mastering the shot. They solicit the sense of sight and/or the sense of hearing in addition to the tactile sense. Thus, the process involves several senses, both simultaneous and proportional.

BRIEF DESCRIPTION OF THE DRAWINGS

The invention will be better understood, and more characteristics and advantages will appear, from the description which follows in reference to the annexed figures, among which.

DETAILED DESCRIPTION OF EMBODIMENTS

Figure 1:
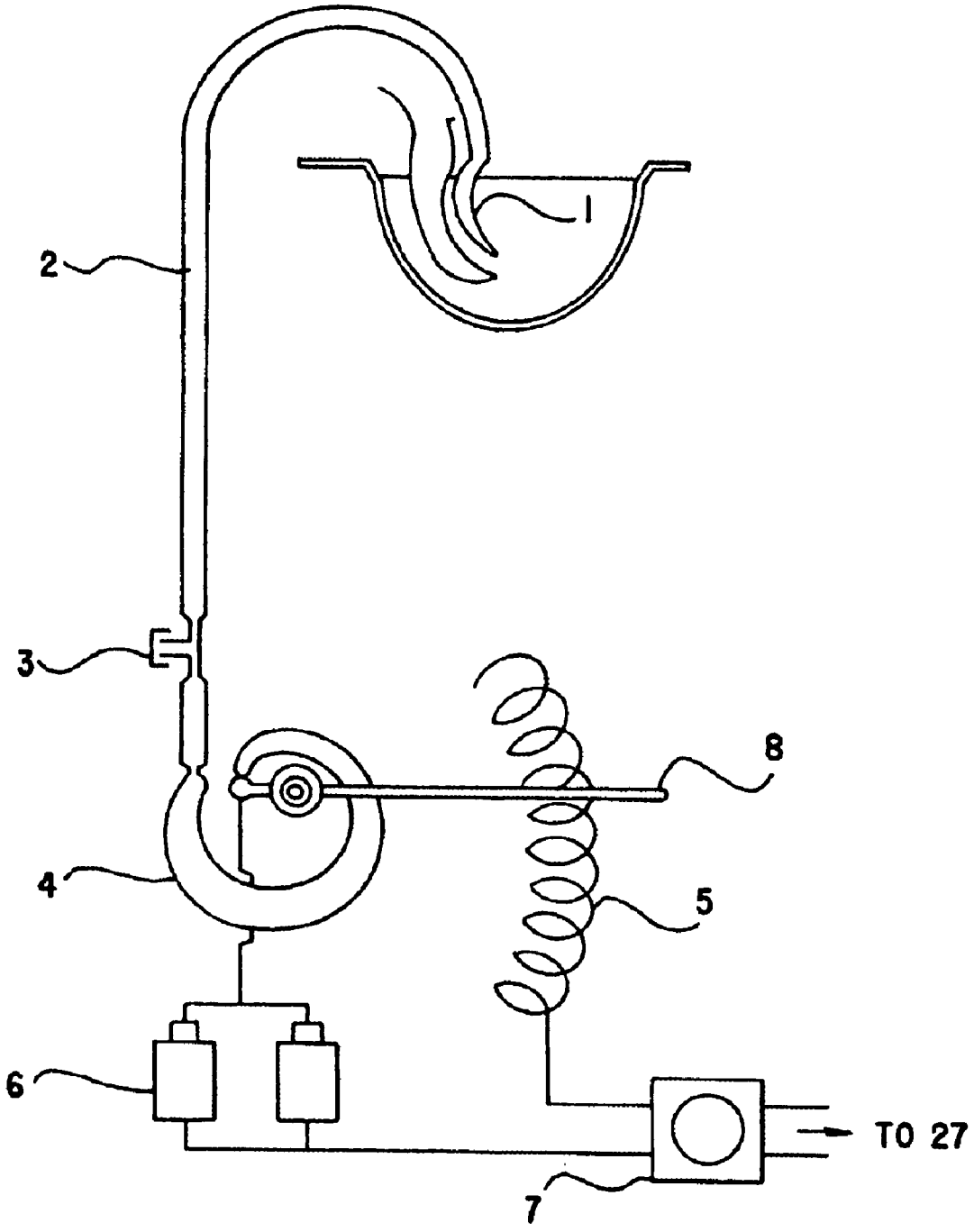
FIG. 1 represents a hydraulic and an electric modulation circuit, according to a first embodiment of the invention.

We are now going to describe a first embodiment of a device for implementing the invention, in reference to FIG. 1.

According to this embodiment, the conversion of the pressure exercised on the trigger 11 of any firearm (not represented) into electric signals is realized by a hydraulic system.

An elastic pressure-receiving capsule 1 is glued on a glove finger placed over the marksman's forefinger (not represented) or fixed to the trigger 11. The liquid-filled capsule is submitted to the pressure exercised by the marksman. A fine, ductile but not elastic tube 2 transmits this pressure, thanks to the liquid, to a manometer 4 which, by the deformation of its flattened tube, acts on the cursor hand 8 of a rheostat 5. In a classical manner there is a purge 3. An electric current source 6 (a cell or rechargeable battery can be used here as well) feeds a serial circuit comprising the rheostat 5 and a receiver organ 7, including an entry resistance. Depending on the pressure exercised by the marksman, the intensity of the current in the serial circuit described above will be more or less strong, because the impedance of the rheostat 5 will vary. The tension on the entry of the receiver organ 7 will then also vary proportionately to the exercised pressure. In other words, the cursor hand 8 of the rheostat 5, pulled by the manometer 4, continuously converts the pressure exercised on the trigger 11, and measured by the elastic capsule 1, into electric signals. The electric signals are then transmitted to the entry of an exploitation organ 27 (not represented in FIG. 1) and will create visual and/or audio signals, in the way described hereafter.

Figure 2:
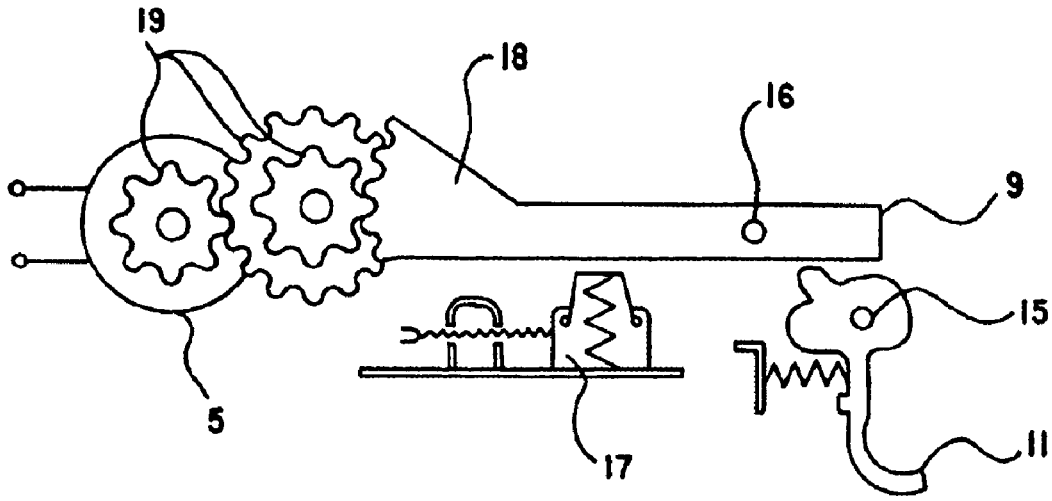
FIG. 2 represents a modulation mechanism and its electric circuit on shooting simulation firearms.

A second embodiment of a device for actuating the invention will now be described referring to FIG. 2.

According to this embodiment, the conversion of the pressure exercised on the trigger 11 of a firearm (not represented) is realized by a mechanical system mounted on the mechanism of this firearm.

The device includes a rheostat 5. The rheostat 5 is driven by a system of rack 18 and gears 19. The rack 18 consists of a toothed partial crown situated in the prolongation of the trigger. It rotates around a fixed axis 16. It is pushed back, at the end near the toothed crown, by a spring 17, and pulled, at its other end 9, by the trigger 11. The latter, rotating around a fixed axis 15, is in turn pushed back by a spring organ. It is precisely this spring organ which creates the pressure to be mastered. The gears (e.g., the number of necessary gears and the number of teeth of each gear) are calculated in such a way that the stroke of the rack 18 corresponds to that of the rheostat 5. As before, the rheostat modifies the amplitude of the current, in such a way as to create electric signals proportional to the pressure exercised on the trigger organ 11. For doing this, the rheostat 5 is placed in series with an electric feeder source and an organ for measuring the current (not represented), exactly similarly to what was described in relation with FIG. 1. The electric signals thus generated are then used in the way which will be described hereafter.

A third embodiment of a device for actuating the invention will be described referring to FIG. 3.

According to this embodiment, the conversion of the pressure exercised on the trigger 11 of a firearm is realized by using a piezoelectric pressure sensor or a similar sensor (quartz, ceramic, etc.).

Figure 3:
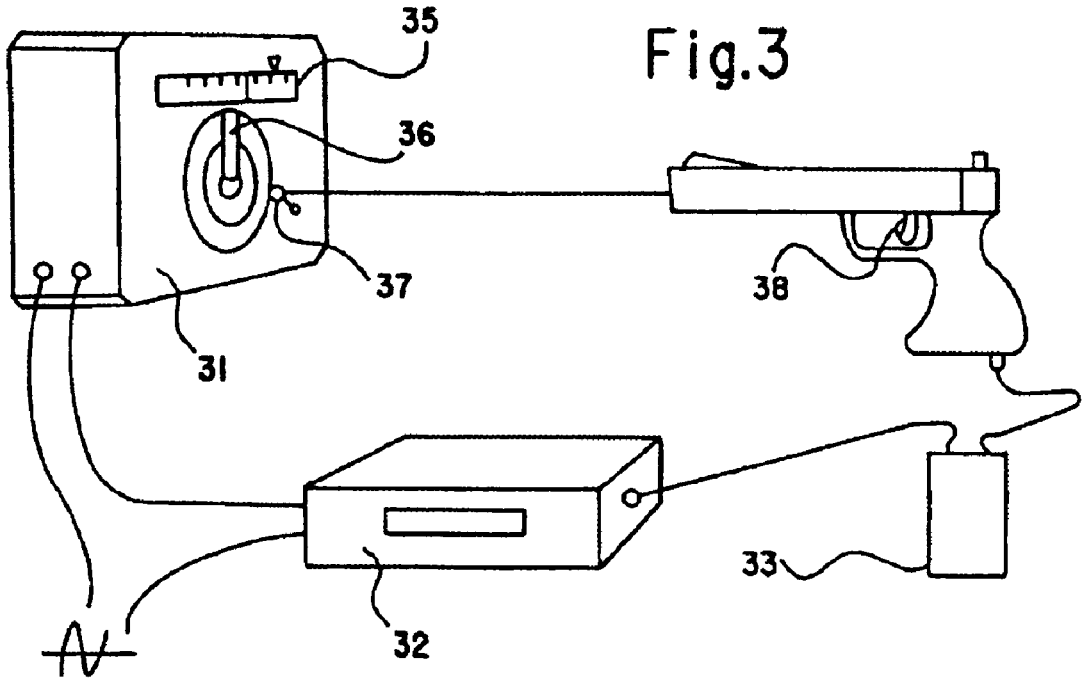
FIG. 3 represents a shooting simulation device according to the invention and its video display system.

The pressure sensor 38 is:

- placed on the trigger, in a housing out of which it protrudes in order to be in contact with the marksman's finger (not represented) on the simulation firearm, as disclosed in FIG. 3;
- clipped by its support in plastic material shaped in mortise profile and adapted to the profile of the trigger and constituting its tenon; or
- placed on a glove or a glove finger, in such a way that it is positioned between the finger and the trigger (on a real firearm).

The sensor 38 is connected to an electronic amplifier. The latter amplifies the signal and, if necessary, adapts it for further usage (impedance adaption, percolation, etc.). The amplifier is housed in a box 33 together with its electric feed, or miniaturized and housed in the real firearm.

The electric signals leaving the amplifier are transmitted to exploitation circuits 32 which will be detailed hereafter.

We are now going to describe the conversion of the electric signals into light signals or visual signals.

The visual signals can be presented to the marksman by different organs of display, in particular:

a) by a voltmeter dial with hand or band, including a cursor indicating the discharge pressure which corresponds to the departure of the shot;

b) by a liquid-crystal visualization organ with three meaningful digits expressed in tens, hundreds and thousands of grammes of force; or c) by a group of electroluminescent diodes of different colors, which light up at particular thresholds of pressure.

Figure 4:
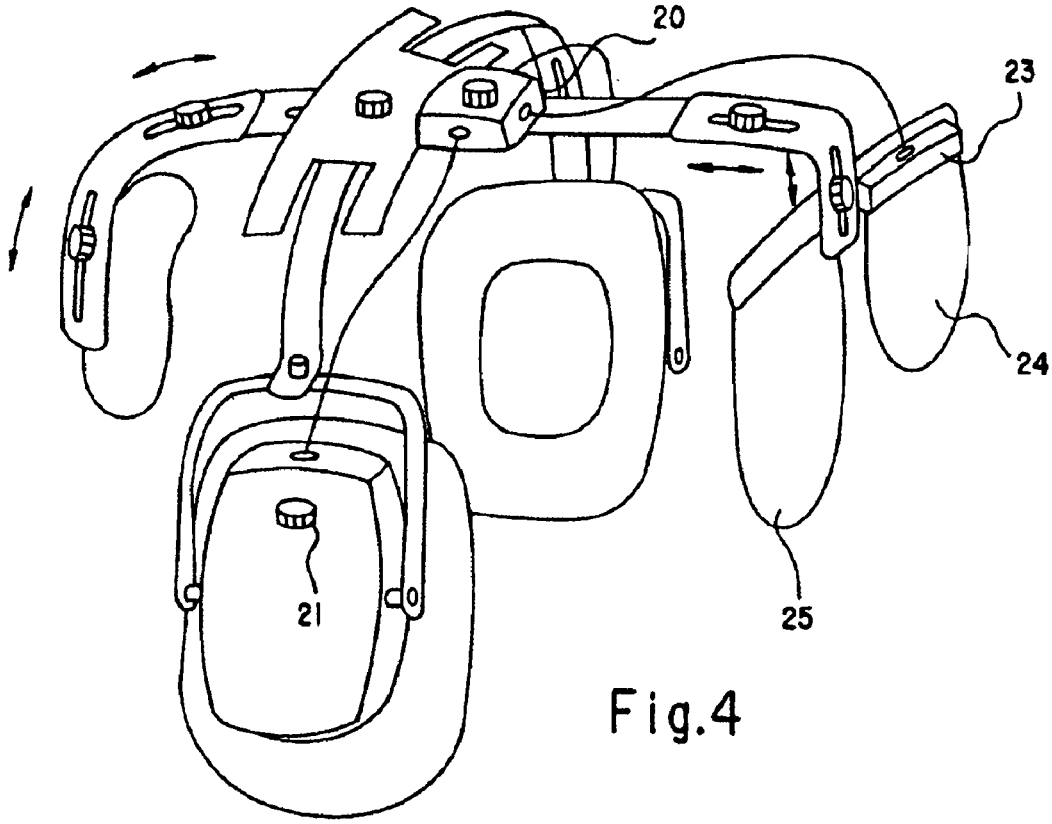
FIG. 4 represents ear muffs carrying signals.

These signals can be displayed directly on the firearm (under the aiming system) or they can be displayed by the sound-protection ear muffs which the marksman generally wears as shown in FIG. 4.

FIG. 4 shows an example of sound-protection ear muffs modified for requirements of the process according to the invention. In the traditional way, it includes two adjustable lateral ear muffs. Also in adjustable position, it furthermore includes, in its front part, two lenses 24 and 25, arranged respectively in front of each of the marksman's eyes, one transparent, the other translucid.

In this embodiment, at the top of one of the lenses 24 or 25 is located a visualization organ 23, for example electroluminescent diodes. The latter displays the signals coming from the conversion of the pressure exercised on the trigger 11 (FIGS. 1 to 3). The visualization organ 23 is placed either on the lens situated in front of the directing eye (the eye which aims), or in front of the other eye. Advantageously, this visualization organ is then able to be fixed in a removable way.

This embodiment with ear muffs applies more particularly to real shooting.

Referring again to FIG. 3, the signals can also be displayed on a distant video display 31, simulating the target that the marksman is aiming at, in the case of simulated shooting.

The signals which represent the pressure exercised on the trigger, as well as other visual signals, are displayed on the video display 31: the pressure by means of representation of a rectangle constituting the dial of a voltmeter or of a liquid crystal dial 35. The pressure can still be represented in the superior half of the vertical axis of the target by an instantaneous pressure vector 36, increasing from top to bottom and arriving at the departure pressure of the shot in the center of the target. The display on the video 31 of the pressure curve in relation to time for the 100 or 200 last force grammes of pressure before the pressure of departure of the shot allows to detect "finger blows" as shown in more details by the diagram of FIG. 6.

Figure 6:
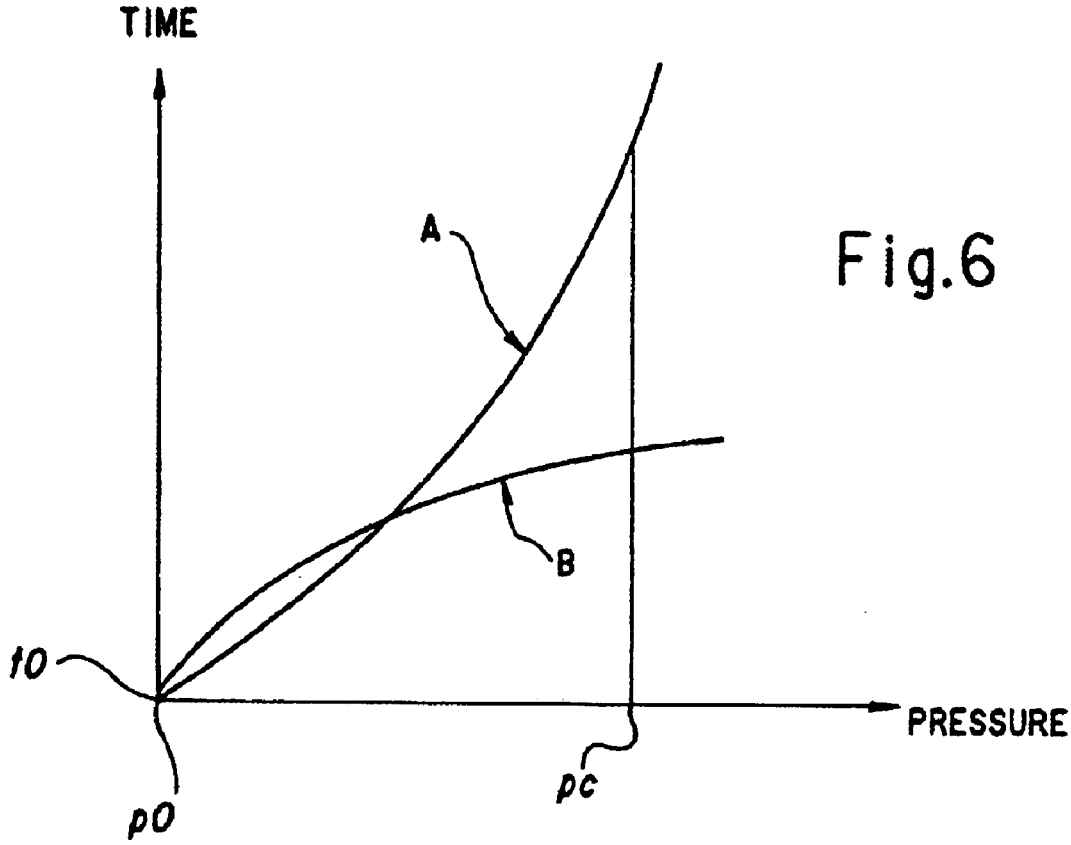
FIG. 6 represents the curve of the pressure on the trigger in relation to time, before the departure of the shot.

FIG. 6 illustrates the variation of the pressure exercised on the trigger in relation to time. On the vertical axis, or time axis, the origin of the time $t_0$ is the moment for which the exercised pressure force $p_0$ (horizontal axis) is, for example, in the range of the 100 or 200 last force grammes before the departure of the shot, typically 800 or 900 fg. More precisely, two curves are represented: curve A illustrates a good shot and curve B a "finger blow", the threshold of triggering-off $p_e$ being reached too rapidly.

The target aimed at here is a virtual target displayed by the video display 31. For this purpose, between the target and the exit of the amplifier box 33 are disposed interface circuits 32 handling the signals received. These circuits can advantageously form a data handling system with recorded program. In this case, these circuits are equipped with a traditional analogic-digital converter.

Furthermore, the firearm emits a collimated laser beam or similar (infrared beam, etc.), whose impact on the target is indicated with Figure 37 in FIG. 3.

The recorded program can advantageously consist of a parameterizable software, in order to offer all the possibilities according to the rules in force in different disciplines of shooting and for all firearm sizes, which offers a great working flexibility. The recorded program can in particular realize an automatic setting to scale of the sizes of the target appearing on the display, in relation to the weapon-target distance measured with the help of the laser beam. For doing this, one can use the laser beam described above. Similarly, one can simulate the dimension of the impacts, according to the calibre of the firearm, the display and the chronological count of the impacts, the display of the total, and of corrections made by the marksman while aiming.

Finally, the recorded program handles the signals received from the amplifier box 33 in order to ensure the correct display of the pressure on the visualization organs 35 and 36.

Figure 7:
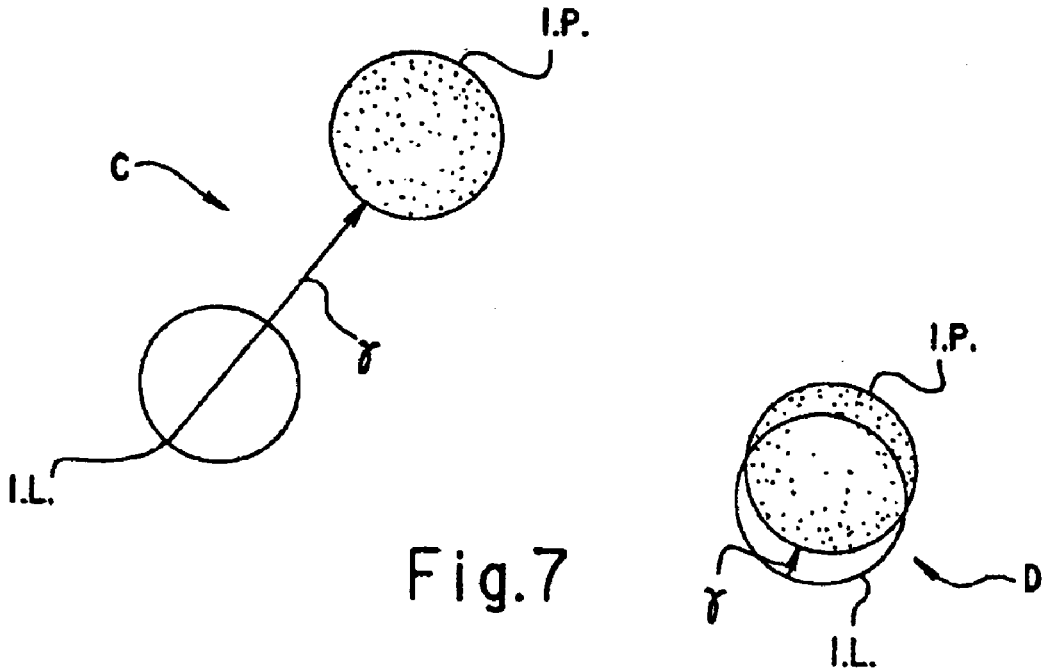
FIG. 7 represents a video display of the impact of a laser bundle and of the simulated impact of a projectile.
Figure 8:
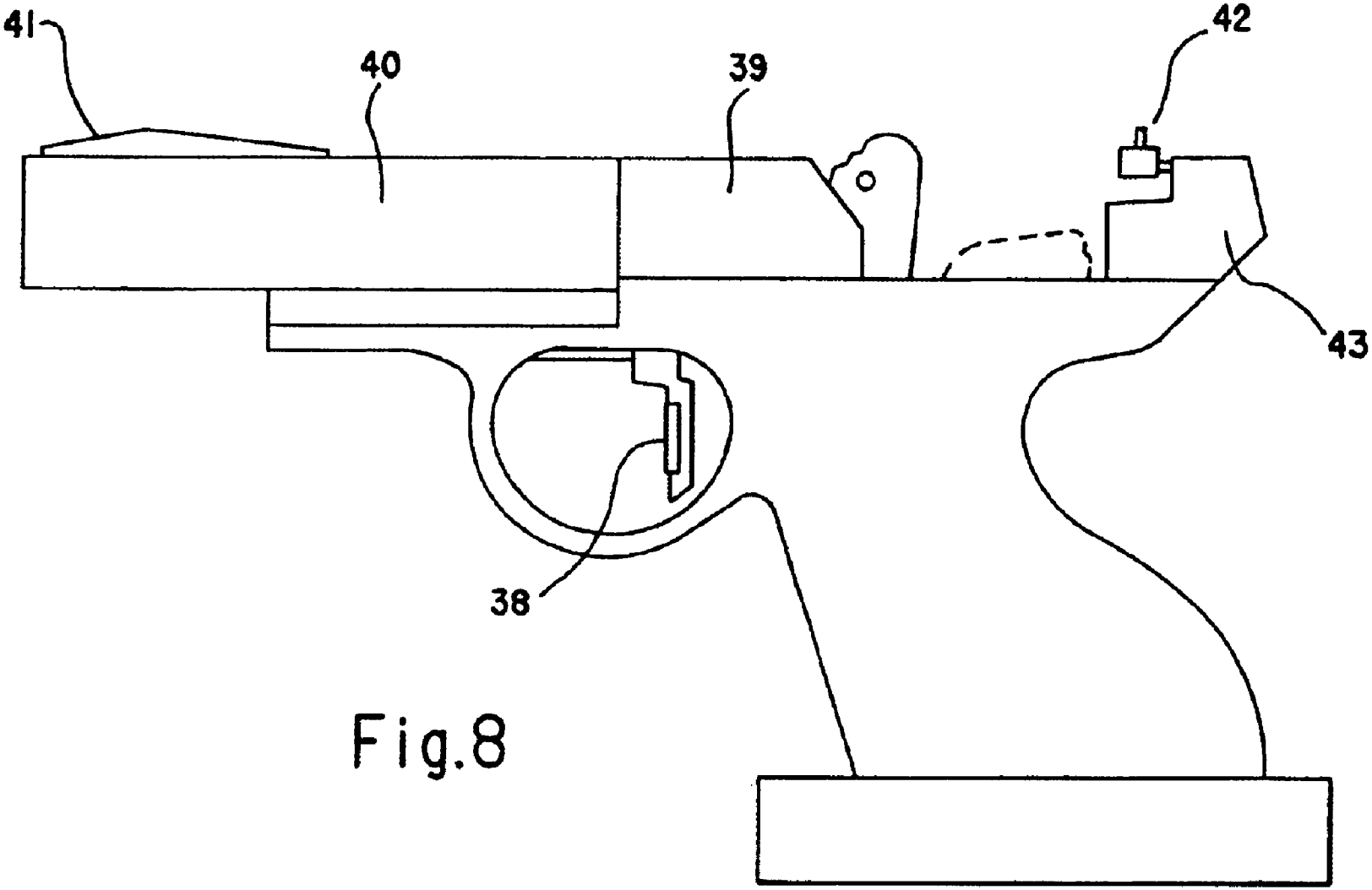
FIG. 8 represents a simulation pistol derived from a real firearm model.

To make up for the absence of an effect on the projectile of the impulse transverse to its trajectory at the departure of the mouth of the gun when the firearm is not stabilized in the case of simulation shooting by a beam (laser beam or other), the software controls the display of two impacts for a single shot as shown in FIG. 7. the first impact or "laser impact" (I.L.) does not take into account the impulse transverse to its trajectory given to the projectile in the case of movement of the firearm at the departure of the shot. The second impact or "projectile impact" (I.P.) corresponds to real shooting with projectile. The two impacts are separated on the display by a vector $\gamma$ representing, in the desired scale, the acceleration transverse to the sighting line which is due to the motion of the firearm in the instant of the departure of the shot. The definition of this vector $\gamma$ (direction, sense and intensity) is obtained thanks to the software which programs the interface 32 (FIG. 3), starting from the segment covered on the video display by the laser impact during the fractions of a second: 1/100 s, 1/50 s, 1/10 s, etc., which precede (or follow) the departure of the shot. FIG. 7 represents two values of the vector $\gamma$, in C, a strong value (that is to say an important movement of the firearm), and in D, a low value (weapon stable).

This indication, besides giving a result that corresponds to real shooting, has the advantage of informing the marksman about the stability of his firearm and of making him aware of what he is doing exactly at the moment very shortly before the release.

As described until now, the pressure exercised on the trigger can be converted into usable electric signals by organs of visualization or a digital data handling system with recorded program, in view of a suitable display.

These electric signals can undergo an additional conversion with the help of an electro-acoustic converter.

Referring again to FIG. 4, it is found that the sound-protection ear muffs include a box 20, for example disposed on the upper side, which receives the electric signals coming from the conversion pressure electric tension (or current), for example of the organ 7 (FIG. 1), on an entry 27. In practice, this entry can take the shape of a jack socket or similar. This box furnishes control signals to the visualization organ 23.

It can however comprise additional electronic circuits which transmit the aforementioned signals to electro-acoustic transducers (not visible) arranged in the ear protection of the ear muffs, through the connection wires 29 and 30. These electroacoustic transducers, for example beepers, are advantageously associated to potentiometers 21, carried by the ear protections, whose control buttons are accessible from outside.

Figure 5:
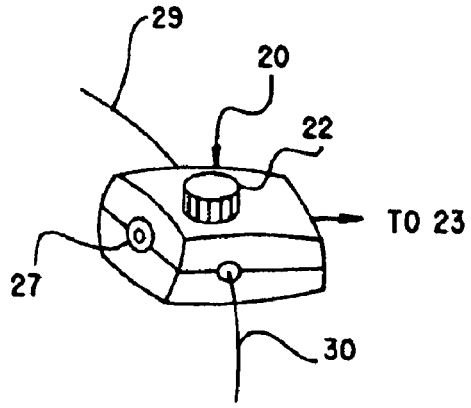
FIG. 5 represents the electronic box of the signal-carrier ear muffs of FIG. 4.

According to this alternative embodiment of the invention, the sound signal, whose intensity increases "in real time" proportionately to the pressure exercised on the trigger, ceases right before the departure of the shot. For this purpose the additional circuits arranged in the box 20 comprise an alternative signal generator in the range of the acoustic frequencies. The amplitude of the alternative signal generated, and thus of the audio signal perceived by the marksman, is controlled by the amplitude of the electric signals received at the entry 27. Furthermore, an attenuation and/or a balancing of the audio signals can be obtained by means of the potentiometers 21. Finally, the range of "silence" is positioned with the help of a supplementary potentiometer 22 comprised in the circuits of the box 20 and accessible from the exterior, as illustrated more in detail in FIG. 5. This potentiometer 22 acts in the classic way in order to fix an adjustable threshold value transmitted to electronic circuits, for example a logic gate that triggers off a bi-stable trigger circuit. The beginning of the range of silence is set at the value of the pressure after which the finger blow is practically not possible anymore.

In the shooting simulator, a beeping sound or any other acoustic signal is furthermore released at the moment of the simulated departure of the blow. For this purpose, one can use the loud-speaker which is generally provided in a video system (FIG. 3: 31).

The device according to the invention uses, in a preferred embodiment, a sensor with piezoelectric effect or similar. This sensor transforms the pressure on the finger on the trigger into signals suitable for improving the marksman's technique, either on a real firearm with ear muffs carrying signals, or on a simulation firearm with a software interface video system.

We are now going to describe a simulation firearm deriving from a real firearm model. The barrel 40 and the gunlock 39 are replaced by a box of the same height. The piezoelectric sensor 38 is placed on the trigger. The amplifier associated with the sensor (FIG. 3:33) is housed at the location of the gunlock 39. The laser emitter is housed at the location of the barrel 40. The box 40 carries the front sight 41 of the target system. The back part of the firearm 43 can carry a display organ 42 for a visual signal (liquid crystal display, electroluminescent diodes or voltmeter dial), and a female jack socket is placed under the handle and links the firearm to the video system (see FIG. 3) through a connection cable (not represented). Preferably, the visualization organ 42 is composed of two groups of three electroluminescent diodes placed symmetrically in relation to the gunsight of the firearm, and also carried by the back part 43; the three electroluminescent diodes of each group being for example in the colors red, green, and yellow, respectively. To each color, a determined pressure amplitude is associated. A diode of a determined color thus lights up when the pressure exercised on the trigger exceeds predetermined thresholds which can be adjusted, in particular, according to the type of simulated firearm.

In order to house the laser beam emitter and the amplifier of the piezoelectric sensor, as one is limited in height by the target system, one can find the necessary space by reducing the width of the compartments 39 and 40 while respecting the same balance of masses as in the real firearm by means of an adequate distribution of ballasts. The global mass of the simulation firearm must be identical with that of the real firearm.

Upon reading what has been said so far, one concludes easily that the invention reaches the goals it set out to fulfil.

It allows in particular a multi-sense multiple involvement which is synchronized, simultaneous and advantageously proportional. It allows a check in real time of the exercised pressure and a training of the marksman's tactile sensitivity. It is compatible with numerous shooting disciplines and is not limited by special firearm types. It can easily be adapted to a shooting simulation system.

It must be clear, however, that the invention is not limited to the sole examples of realization explicitly described, in particular in relation to FIGS. 1 to 8.

In a variant, which is not represented, it is in particular possible to adapt the process according to the invention to a hunting firearm, even a military firearm, which includes an aiming telescope. The visualization organ, for example of the type including electroluminescent diode bars, can be integrated in the telescope or placed in front of it.

What is claimed is:

1. Process for training in real time a tactile perception of a marksman, in particular of a sport marksman, during the firing of a shot, said marksman exercising a pressure on a trigger of a real or simulation firearm and said pressure triggering the shot when it crosses a predetermined threshold, said process comprising at least the following steps:

(i) measuring in real time the pressure exercised on said trigger by a finger of said marksman;

(ii) converting said measured pressure into electric signals representing an instantaneous amplitude of a pressure vector;

(iii) transforming in real time said electric signals into signals perceptible by a sense of the marksman other than a tactile perception so that the marksman can in real time follow the variation of the pressure exercised on said trigger until the departure of said shot in simultaneity and in synchronism with a tactile perception perceived by said finger.

2. Process according to claim 1, wherein said sense other than the tactile perception is the sense of sight and said step of transforming the electric signals consists in transforming said electric signals, obtained during the conversion step, into light signals representing, proportionately continuously or by moderate intervals, variations of amplitude of the pressure exercised on said trigger.

3. Process according to claim 1, wherein said sense other than the tactile perception is the sense of hearing and said step of transforming the electric signals consists in transforming said electric signals, obtained during the conversion step, into audio signals whose intensity represents, proportionately continuously or by moderate intervals, variations of amplitude of the pressure exercised on said trigger.

4. Device for training in real time a tactile perception of a marksman, in particular of a sport marksman, during the firing of a shot, said marksman exercising a pressure on a trigger of a real or simulation firearm and said pressure triggering the shot when it crosses a predetermined threshold, wherein said device includes (i) a pressure sensor for measuring in real time the pressure exercised by the marksman's finger on said trigger, comprising (a) a hydraulic circuit including an elastic pressure-receiving capsule filled with liquid which receives the pressure exercised by the marksman, (b) a fine ductile tube which is not elastic, and (c) a manometer to which this pressure is transmitted through said liquid, (ii) a serial circuit for converting the measured pressure into electric signals comprising (a) an electric feeder source and (b) a rheostat, said manometer being mechanically coupled to a cursor hand of said rheostat and making an impedance of said rheostat vary, in such a way as to generate electric signals representing the instantaneous pressure exercised on said trigger, and (iii) an organ measuring the instantaneous amplitude of a current in said serial circuit, in such a way as to transform in real time said electric signals representing the instantaneous pressure exercised on said trigger into signals perceptible by a sense of the marksman other than a tactile perception.

5. Device according to claim 4, wherein said organ transforms said electric signals into light signals and displays these light signals, said organ comprising a voltmeter hand or band, a set of electroluminescent diodes or a video display, so that said light signals are displayed in a continuously variable way in order to represent the instantaneous variation of said exercised pressure, or by moderate intervals when the pressure crosses predetermined thresholds.

6. Device according to claim 5, wherein said firearm is a simulation firearm and said display is a video display, said device being furthermore equipped with means for generating a laser bundle or similar towards a target display and with interface circuits which receive said electric signals, said interface circuits being composed of circuits for handling signals according to a recorded program, said recorded program including parameterizable rules taking into account predetermined disciplines of shooting and the calibre of the simulated firearm, and controlling at least (i) generation of control signals of said display for setting to scale said target in relation to a distance target-firearm, (ii) display of simulated impacts on said target whose sizes vary in relation to said calibre, (iii) a specific timing for each of said disciplines, (iv) display and a chronological numbering of the impacts, (v) a total numbering of impacts, and (vi) corrections made by said marksman during aiming.

7. Device according to claim 4, wherein said organ transforms said electric signals into audible signals in the acoustic frequency band and comprises at least one electroacoustic transducer disposed in an ear protection of sound-protection ear muffs carried by said marksman, in such a way as to emit said audible signals in a continuously variable way to represent the instantaneous variation of said exercised pressure, or by moderate intervals when the pressure crosses predetermined thresholds.

8. Device according to claim 4, wherein said firearm is a simulation firearm and said display is a video display, said device being furthermore equipped with means for generating a laser bundle or similar towards a target display and with interface circuits which receive said electric signals, said interface circuits being composed of circuits for handling signals according to a recorded program, said recorded program including parameterizable rules taking into account predetermined disciplines of shooting and the calibre of the simulated firearm, and controlling at least (i) generation of control signals of said display for setting to scale said target in relation to a distance target-firearm, (ii) display of simulated impacts on said target whose sizes vary in relation to said calibre, (iii) a specific timing for each of said disciplines, (iv) display and a chronological numbering of the impacts, (v) a total numbering of impacts, and (vi) corrections made by said marksman during aiming.

9. Device according to claim 8, wherein said video display includes a central zone comprising (i) a visual display representing in a continuously variable way, according to a vertical axis of said target, the instantaneous vector of the pressure exercised on said trigger, said visual indication increasing from top to bottom and reaching the escape pressure at the center of the target, and (ii) a display zone representing a transverse acceleration vector ($\gamma$) of said firearm in the moment of the shot from an impact called "laser" towards an impact called "projectile" which takes into account the effect, on a projectile, of an impulse transverse to its trajectory at the time of the shot, by measuring the segment covered on said pending target of predetermined time lapses that frame this shot, said displays being under the control of the recorded program in said interface circuits.

[10. Device according to claim 8, wherein said video display includes a central zone comprising (i) a visual display representing in a continuously variable way, according to a vertical axis of said target, the instantaneous vector of the pressure exercised on said trigger, said visual indication increasing from top to bottom and reaching the escape pressure at the center of the target, and (ii) a display zone representing a transverse acceleration vector ($\gamma$) of said firearm in the moment of the shot from an impact called "laser" towards an impact called "projectile" which takes into account the effect, on a projectile, of an impulse transverse to its trajectory at the time of the shot, by measuring the segment covered on said pending target of predetermined time lapses that frame this shot, said displays being under the control of the recorded program in said interface circuits.]

[11. Device according to claim 8, wherein said video display includes a central zone comprising (i) a visual display representing in a continuously variable way, according to a vertical axis of said target, the instantaneous vector of the pressure exercised on said trigger, said visual indication increasing from top to bottom and reaching the escape pressure at the center of the target, and (ii) a display zone representing a transverse acceleration vector ($\gamma$) of said firearm in the moment of the shot from an impact called "laser" towards an impact called "projectile" which takes into account the effect, on a projectile, of an impulse transverse to its trajectory at the time of the shot, by measuring the segment covered on said pending target of predetermined time lapses that frame this shot, said displays being under the control of the recorded program in said interface circuits.]

[12. Device according to claim 8, wherein said video display includes a central zone comprising (i) a visual display representing in a continuously variable way, according to a vertical axis of said target, the instantaneous vector of the pressure exercised on said trigger, said visual indication increasing from top to bottom and reaching the escape pressure at the center of the target, and (ii) a display zone representing a transverse acceleration vector ($\gamma$) of said firearm in the moment of the shot from an impact called "laser" towards an impact called "projectile" which takes into account the effect, on a projectile, of an impulse transverse to its trajectory at the time of the shot, by measuring the segment covered on said pending target of predetermined time lapses that frame this shot, said displays being under the control of the recorded program in said interface circuits.]

13. Device for training in real time a tactile perception of a marksman, in particular of a sport marksman, during the firing of a shot, said marksman exercising a pressure on a trigger of a real or simulation firearm and said pressure triggering the shot when it crosses a predetermined threshold, wherein said device includes (i) a pressure sensor for measuring the pressure exercised by the marksman's finger on said trigger, comprising a rack actuated by said trigger and driving a set of gears, (ii) a serial circuit comprising (a) an electric feeder source and (b) a rotatable rheostat driven by said set of gears, in such a way as to generate electric signals representing the instantaneous pressure exercised on said trigger, and (iii) an organ measuring an instantaneous amplitude of a current in said serial circuit, in such a way as to transform in real time said electric signals representing the instantaneous pressure exercised on said trigger into signals perceptible by a sense of the marksman other than a tactile perception.

14. Device according to claim 13, wherein said organ transforms said electric signals into light signals and displays these light signals, said organ comprising a voltmeter hand or band, a set of electroluminescent diodes or a video display, so that said light signals are displayed in a continuously variable way in order to represent the instantaneous variation of said exercised pressure, or by moderate intervals when the pressure crosses predetermined thresholds.

[15. Device according to claim 13, wherein said organ transforms said electric signals into light signals and displays these light signals, said organ comprising a voltmeter hand or band, a set of electroluminescent diodes or a video display, so that said light signals are displayed in a continuously variable way in order to represent the instantaneous variation of said exercised pressure, or by moderate intervals when the pressure crosses predetermined thresholds.]

16. Device according to claim 13, wherein said organ transforms said electric signals into audible signals in the acoustic frequency band and comprises at least one electroacoustic transducer disposed in an ear protection of sound-protection ear muffs carried by said marksman, in such a way as to emit said audible signals in a continuously variable way to represent the instantaneous variation of said exercised pressure, or by moderate intervals when the pressure crosses predetermined thresholds.

17. Device according to claim 13, wherein said firearm is a simulation firearm and said display is a video display, said device being furthermore equipped with means for generating a laser bundle or similar towards a target display and with interface circuits which receive said electric signals, said interface circuits being composed of circuits for handling signals according to a recorded program, said recorded program including parameterizable rules taking into account predetermined disciplines of shooting and the calibre of the simulated firearm, and controlling at least (i) generation of control signals of said display for setting to scale said target in relation to a distance target-firearm, (ii) display of simulated impacts on said target whose sizes vary in relation to said calibre, (iii) a specific timing for each of said disciplines, (iv) display and a chronological numbering of the impacts,(v) a total numbering of impacts, and (vi) corrections made by said marksman during aiming.

18. Device for training in real time a tactile perception of a marksman, in particular of a sport marksman, during the firing of a shot, said marksman exercising a pressure on a trigger of a real or simulation firearm and said pressure triggering the shot when it crosses a predetermined threshold, wherein said device includes (i) a pressure or force sensor with piezoelectric effect placed in a glove finger or fixed on the trigger for measuring in real time the pressure exercised by the finger of said marksman on said trigger, said sensor with piezoelectric effect generating electric signals whose amplitude is proportional to the exercised pressure, (ii) an electronic amplifier to which said electric signals whose amplitude is proportional to the exercised pressure are transmitted, an exit of said electronic amplifier generating electric signals representing the instantaneous pressure exercised on said trigger, and (iii) an organ measuring an instantaneous amplitude of a current at the exit of said electronic amplifier, in such a way as to transform in real time said electric signals representing the instantaneous pressure exercised on said trigger into signals perceptible by a sense of the marksman other than a tactile perception.

19. Device according to claim 18, wherein said organ transforms said electric signals into audible signals in the acoustic frequency band and comprises at least one electroacoustic transducer disposed in an ear protection of sound-protection ear muffs carried by said marksman, in such a way as to emit said audible signals in a continuously variable way to represent the instantaneous variation of said exercised pressure, or by moderate intervals when the pressure crosses predetermined thresholds.

20. Device according to claim 18, wherein said firearm is a simulation firearm and said display is a video display, said device being furthermore equipped with means for generating a laser bundle or similar towards a target display and with interface circuits which receive said electric signals, said interface circuits being composed of circuits for handling signals according to a recorded program, said recorded program including parameterizable rules taking into account predetermined disciplines of shooting and the calibre of the simulated firearm, and controlling at least (i) generation of control signals of said display for setting to scale said target in relation to a distance target-firearm, (ii) display of simulated impacts on said target whose sizes vary in relation to said calibre,(iii) a specific timing for each of said disciplines, (iv) display and a chronological numbering of the impacts, (v) a total numbering of impacts, and (vi) corrections made by said marksman during aiming.

21. Device for training in real time a tactile perception of a marksman, in particular of a sport marksman, during the firing of a shot, said marksman exercising a pressure on a trigger of a real or simulation firearm and said pressure triggering the shot when it crosses a predetermined threshold, wherein said device includes (i) a pressure sensor for measuring in real time the pressure exercised by the marksman's finger on said trigger, (ii) a serial circuit for converting the measured pressure into electric signals representing the instantaneous pressure exercised on said trigger, and (iii) an organ measuring the instantaneous amplitude of a current in said serial circuit, in such a way as to transform in real time said electric signals representing the instantaneous pressure exercised on said trigger into signals perceptible by a sense of the marksman other than a tactile perception.

*22. Device according to claim 17, wherein said video display includes a central zone comprising*

*(i) a visual display representing in a continuously variable way, according to a vertical axis of said target, the instantaneous vector of the pressure exercised on said trigger, said visual indication increasing from top to bottom and reaching the escape pressure at the center of the target, and*

*(ii) a display zone representing a transverse acceleration vector* ($\gamma$) *of said firearm in the moment of the shot from an impact called "laser" towards an impact called "projectile" which takes into account the effect, on a projectile, of an impulse transverse to its trajectory at the time of the shot, by measuring the segment covered on said pending target of predetermined time lapses that frame this shot,*

*said displays being under the control of the recorded program in said interface circuits.*

*23. Device according to claim 20, wherein said video display includes a central zone comprising*

*(i) a visual display representing in a continuously variable way, according to a vertical axis of said target, the instantaneous vector of the pressure exercised on said trigger, said visual indication increasing from top to bottom and reaching the escape pressure at the center of the target, and*

*(ii) a display zone representing a transverse acceleration vector* ($\gamma$) *of said firearm in the moment of the shot from an impact called "laser" towards an impact called "projectile" which takes into account the effect, on a projectile, of an impulse transverse to its trajectory at the time of the shot, by measuring the segment covered*

*on said pending target of predetermined time lapses that frame this shot,*

*said displays being under the control of the recorded program in said interface circuits.*

*24. Device according to claim 6, wherein said video display includes a central zone comprising*

(*i*) *a visual display representing in a continuously variable way, according to a vertical axis of said target, the instantaneous vector of the pressure exercised on said trigger, said visual indication increasing from top to bottom and reaching the escape pressure at the center of the target, and*

(*ii*) *a display zone representing a transverse acceleration vector* (γ) *of said firearm in the moment of the shot from an impact called "laser" towards an impact called "projectile" which takes into account the effect, on a projectile, of an impulse transverse to its trajectory at the time of the shot, by measuring the segment covered on said pending target of predetermined time lapses that frame this shot,*

*said displays being under the control of the recorded program in said interface circuits.*

*25. Device according to claim 18, wherein said organ transforms said electric signals into light signals and displays these light signals, said organ comprising a voltmeter hand or band, a set of electroluminescent diodes or a video display, so that said light signals are displayed in a continuously variable way in order to represent the instantaneous variation of said exercised pressure, or by moderate intervals when the pressure crosses predetermined thresholds.*

* * * * *